United States Patent
Xie et al.

(10) Patent No.: US 11,638,437 B2
(45) Date of Patent: May 2, 2023

(54) AUTOMATIC IMMERSION ICE-COATING MACHINE

(71) Applicant: Shanghai Ocean University, Shanghai (CN)

(72) Inventors: Jing Xie, Shanghai (CN); Wenhui Yu, Shanghai (CN); Jinfeng Wang, Shanghai (CN); Mingtang Tan, Shanghai (CN); Xuesong Wang, Shanghai (CN)

(73) Assignee: Shanghai Ocean University, Shanghai (CN)

( * ) Notice: Subject to any disclaimer, the term of this patent is extended or adjusted under 35 U.S.C. 154(b) by 437 days.

(21) Appl. No.: 16/820,526

(22) Filed: Mar. 16, 2020

(65) Prior Publication Data
US 2021/0051984 A1    Feb. 25, 2021

(30) Foreign Application Priority Data
Aug. 23, 2019    (CN) .......................... 201910786665.2

(51) Int. Cl.
*A23L 3/375* (2006.01)
*A23B 4/06* (2006.01)
(Continued)

(52) U.S. Cl.
CPC .............. *A23L 3/375* (2013.01); *A23B 4/062* (2013.01); *A23B 4/09* (2013.01); *A23L 3/361* (2013.01); *F25D 13/06* (2013.01); *A23V 2002/00* (2013.01)

(58) Field of Classification Search
CPC ......... A23L 3/375; A23L 3/361; A23B 4/062; A23B 4/09; F25D 13/06; A23V 2002/00
See application file for complete search history.

(56) References Cited

U.S. PATENT DOCUMENTS

| | | | |
|---|---|---|---|
| 4,361,016 A | * | 11/1982 | Multack ................. F25D 17/02 62/374 |
| 4,719,760 A | * | 1/1988 | Takayuki ............... F25D 13/04 62/65 |

(Continued)

FOREIGN PATENT DOCUMENTS

| CN | 109329380 A |   | 2/2019 | |
|---|---|---|---|---|
| CN | 109548854 A | * | 4/2019 | ............... A23B 4/09 |
| CN | 109548854 A |   | 4/2019 | |

OTHER PUBLICATIONS

CN109548854A Translation (Year: 2019).*

*Primary Examiner* — Elizabeth J Martin
*Assistant Examiner* — Dario Antonio Deleon

(57) ABSTRACT

Disclosed is an automatic immersion ice-coating machine, including a frame, an ice-coating working pool, a feed port, a conveying device, a control system and a driving system. A first side of the ice-coating working pool communicates with a buffer tank. A bottom of the ice-coating working pool is stepped or inclined, and a drain valve is provided at a bottom of the ice-coating working pool. The conveying device includes a first conveyor belt and a second conveyor belt. The first conveyor belt is located under the feed port, and a lower portion of the first conveyor belt is lower than the liquid level, and the second conveyor belt communicates with the discharge port. The first and second conveyor belts are made of stainless steel mesh belts, and surfaces of the stainless steel mesh belts are provided with separators in a spaced manner.

7 Claims, 2 Drawing Sheets

(51) Int. Cl.
  *A23B 4/09* (2006.01)
  *A23L 3/36* (2006.01)
  *F25D 13/06* (2006.01)

(56) References Cited

U.S. PATENT DOCUMENTS

| | | | |
|---|---|---|---|
| 4,955,209 A * | 9/1990 | Smith | F25D 25/04 |
| | | | 62/380 |
| 5,946,922 A * | 9/1999 | Viard et al. | F25B 49/00 |
| | | | 62/126 |
| 5,966,962 A * | 10/1999 | Murray et al. | F25D 17/02 |
| | | | 62/374 |
| 2012/0000217 A1 * | 1/2012 | Gudnason | F25C 1/00 |
| | | | 62/68 |
| 2019/0323755 A1 * | 4/2019 | Goldstein | F25D 3/02 |
| 2019/0134677 A1 * | 5/2019 | Terao | B08B 3/04 |

* cited by examiner

AUTOMATIC IMMERSION ICE-COATING MACHINE

CROSS-REFERENCE TO RELATED APPLICATIONS

This application claims the benefit of priority from Chinese Patent Application No. 201910786665.2, filed on Aug. 23, 2019. The content of the aforementioned applications, including any intervening amendments thereto, are incorporated herein by reference.

TECHNICAL FIELD

The present application relates to fresh-keeping techniques for aquatic products, and more particularly to an automatic immersion ice-coating machine.

BACKGROUND

The consumption of aquatic products is huge in China. The processed aquatic products are mainly frozen aquatic products. Shrimps, as an important aquatic product, are rich in protein, low in fat, delicious in taste, and high in nutritive value, so shrimps are widely welcomed by consumers. To maintain the quality of shrimps, the surface of the shrimps will be coated with a layer of ice, which is called ice coatings. During transportation and storage time, ice coatings can prevent spoilage and drying loss of the shrimps. Obviously, during freezing, the ice coating significantly reduces oxidative deterioration and drying loss, so that the quality of shrimps is maintained.

The ice coating methods mainly adopt rectangular immersion tanks, and the shrimps are transported to the elongated water tanks via conveyor belts to complete the entire ice-coating process. However, the shrimps are closely attached to the conveyor belt, causing problems such as adhesion of shrimps and uneven ice coating. In addition, after frozen, the density of the shelled shrimp is reduced, resulting that the shrimps may float on the liquid surface of the water tank. The existing ice-coating machine applies ice coatings on those shrimps floating on the liquid surfaces using a spray method, which causes uneven ice coatings on those shrimps, thereby affecting the quality of shrimps.

SUMMARY

The present invention aims is to provide an automatic immersion ice-coating machine, which is simple and reliable, so as to solve problems encountered in ice-coating processes for materials.

To achieve the above object, the present invention provides an automatic ice-coating machine, including:
a frame;
an ice-coating working pool;
a feed port;
a discharge port;
a conveying device;
a control system; and
a driving system;
wherein the frame is provided with a first conveyor belt and a second conveyor belt, and the ice-coating working pool and a buffer tank are provided in the frame;
the buffer tank is fixed outside the ice-coating working pool, and a water inlet pipe is fixedly connected with the buffer tank and the ice-coating working pool;

a level sensor and a nozzle are fixed on a first inner wall of the ice-coating working pool, and a temperature sensor is fixed on a second inner wall of the ice-coating working pool, and a drain valve is mounted at a bottom of the ice-coating working pool;
the feed port is arranged above the first conveyor belt of the frame, and a ramp baffle is arranged at the feed port for feeding in an inclined manner;
eight support columns are fixed at a lower end of the frame, and a universal wheel is installed at a lower end of each of the support columns, and a truss is installed at a joint between each of the support columns and the frame for connection;
a bottom of the ice-coating working pool is stepped or inclined, and the drain valve is arranged at a bottom of the ice-coating working pool;
the control system and the drive device are arranged under the discharge port; when the level sensor detects that a level of an ice-coating liquid drops, the control system automatically replenishes the ice-coating liquid from the buffer tank, and automatically sounds an alarm when the ice-coating liquid in the buffer tank is insufficient;
an inverter is arranged in the drive device, and a speed of the first conveyor belt and the second conveyor belt is controlled by a drive system, thereby controlling a thickness of an ice coating;
an upper portion of the first conveyor belt is slightly inclined, and a lower portion of the first conveyor belt is immersed in the ice-coating liquid; a driven wheel of the first conveyor belt is provided with a slide rail to adjust a height of the first conveyor belt;
the water inlet pipe and the drain valve each are provided with a solenoid valve which is controlled by the control system;
the first and second conveyor belts both are made of food-grade stainless steel mesh belts, and separators are arranged on surfaces of the first and second conveyor belts to move materials.

Specifically, the present invention provides an automatic immersion ice-coating machine for shrimps, comprising: a frame; an ice-coating working pool is provided in the frame, and the frame is provided with a first conveyor belt and a second conveyor belt. The first conveyor belt is provided with an arc-shaped slide rail to adjust the height of the first conveyor belt, and a feed port is provided above the first conveyor belt for feeding, and the second conveyor belt is connected with the discharge port. A buffer tank is fixed on a side of the ice-coating working pool, and the water inlet pipe is connected to the buffer tank and the ice-coating working pool. The control system and the driving system are fixedly arranged under the frame, and the drive device controls the speed of the conveyor belt to control the thickness of the ice coating.

Eight support columns are installed at a lower end of the frame, and a universal wheel is fixedly installed at a lower end of each of the support columns, and a truss is installed at a joint between each of the support columns and the frame to reinforce the connection therebetween.

The height difference between the first conveyor belt and the second conveyor belt can be adjusted by the slide rail. An arc length of the arc-shaped slide rail is about 30 cm and an arc thereof is 7°. The lower portion of the first conveyor belt is immersed into the ice-coating liquid to ensure that the shrimps will not float on the surface of the ice coating liquid.

A nozzle is provided at a first side of the first conveyor belt for spraying the ice coating liquid. Due to the disturbance of the liquid sprayed by the nozzle, the shrimps continuously roll in the ice-coating liquid while dropping into the ice-coating liquid, so that the ice coatings of the shrimps are made to be more uniform to avoid burrs, and moreover, the ice coatings of the shrimps have a high transparency.

The buffer tank and the ice-coating working pool are fixed at the frame, and a level sensor is installed inside the ice-coating working pool. During the process of ice coating, with the consumption of the ice-coating liquid, when the level of the ice coating liquid drops, the control system will automatically replenish the ice-coating liquid from the buffer tank.

The temperature sensor is fixedly installed at the inner wall of the ice-coating working pool. When the temperature of the ice-coating working pool deviates from a set temperature, the control system will automatically turn on a refrigeration device to control the temperature of the ice-coating working pool.

Surfaces of the first conveyor belt and the second conveyor belt both have a mesh structure, and inclined baffles are arranged on the first conveyor belt and the second conveyor belt in a spaced manner, so that materials are transported in a large inclination angle.

The control system, the refrigeration device and the drive device are arranged under the second conveyor belt. The control system will automatically control the conveying speed of the second conveyor belt after set the time for ice coating.

The bottom of the ice-coating working pool is stepped or inclined, and the drain valve is arranged at a side of the bottom of the ice-coating working pool.

The present invention provides an automatic immersion ice-coating machine, which has a simple structure, reasonable design, high degree of automation and good ice coating effect. In addition, it is easy to use and can be moved freely through the universal wheel installed at the bottom of the frame. The speed of the conveyor belts is controlled by the control system and the drive device to control the thickness of the ice coating on the surface of the materials. Also, the dropping time of the shrimps in the ice-coating fluid is controlled by adjusting the height of the slide rail, so that the shelled shrimp can be evenly coated with the ice coating. Thus, such machine has a good continuity and high degree of automation.

Figure 1:
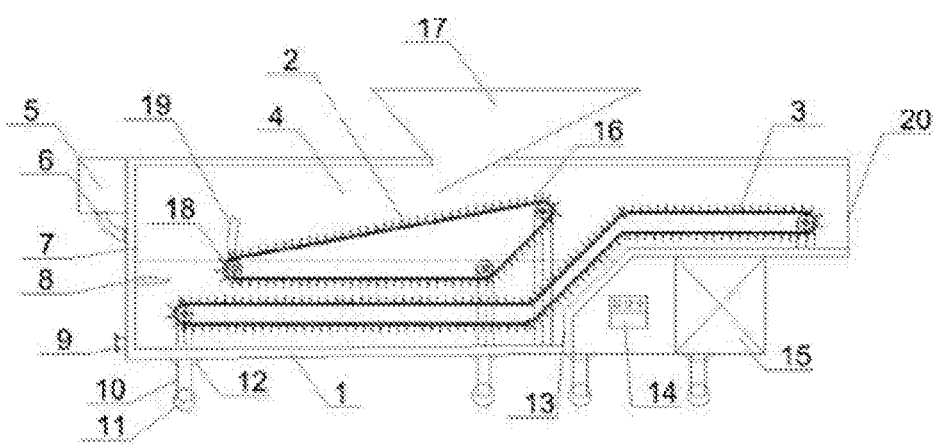
FIG. 1 is a schematic diagram of an automatic immersion ice-coating machine of the present invention.

In the drawings: 1, frame; 2, first conveyor belt; 3, second conveyor belt; 4, ice-coating working pool; 5, buffer tank; 6, water inlet pipe; 7, level sensor; 8, nozzle; 9, drain valve; 10, support column; 11, universal wheel; 12, truss; 13, temperature sensor; 14, controller 15, drive device; 16, separator; 17, feed port; 18, driven wheel of the first conveyor belt; 19, slide rail; 20, discharge port.

DETAILED DESCRIPTION OF EMBODIMENTS

The present invention will be described in detail with reference to the following embodiment, from which the content of the present invention will be clearer.

In the description of the present disclosure, terms "left", "right" and the like refer to orientation or positional relationship shown in the drawings, which are merely for better description of the present disclosure and do not require that the present disclosure must be in specific positional configurations with specific operations. They are not intended to limit the present disclosure.

Figure 2:
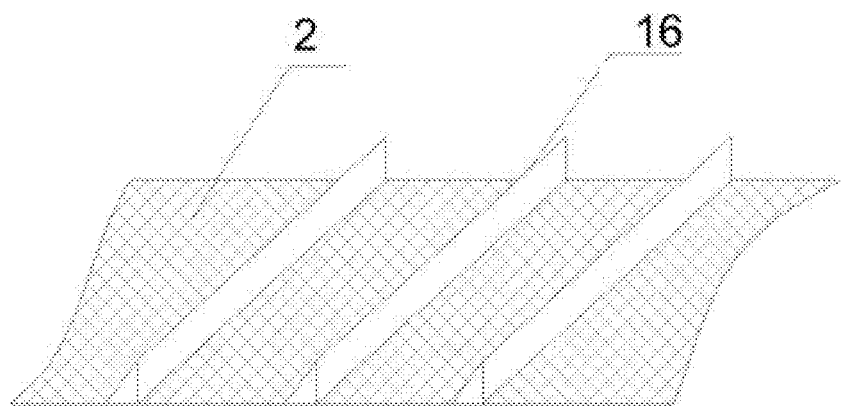
FIG. 2 is a schematic diagram of a conveyor belt of the present invention.

As shown in FIGS. 1 and 2, the automatic ice-coating machine includes a frame 1, an ice-coating working pool 4, a feed port 17, a discharge port 20, a conveying device, a control system, and a driving system; the frame 1 is provided with a first conveyor belt 2 and a second conveyor belt 3.

The ice-coating working pool 4 and a buffer tank 5 are provided in the frame. The buffer tank 5 is fixed outside the ice-coating working pool 4, and the water inlet pipe 6 is fixedly connected with the buffer tank 5 and the ice-coating working pool 4. A level sensor 7 and a nozzle 8 are fixed on a first inner wall of the ice-coating working pool 4; a temperature sensor 13 is fixed on a second inner wall of the ice-coating working pool 4, and a drain valve 9 is mounted at a bottom of the ice-coating working pool 4. The feed port 17 is arranged above the first conveyor belt of the frame, and a ramp baffle is arranged at the feed port 17 for feeding in an inclined manner.

Eight support columns 10 are fixed at a lower end of the frame; a universal wheel 11 is installed at a lower end of each of the support columns 10, and a truss 12 is installed at a joint between each of the support columns and the frame for connection.

A bottom of the ice-coating working tank is stepped or inclined, and the drain valve 9 is arranged at a bottom of the ice-coating working pool.

The control system 14 and the drive device 15 are arranged under the discharge port 20. When the level sensor 7 detects that a level of an ice-coating liquid drops, the control system automatically replenishes the ice-coating liquid from the buffer tank 5 and automatically sounds an alarm when the ice-coating liquid in the buffer tank 5 is insufficient.

An inverter is installed in the drive device, and a speed of the first conveyor belt 2 and the second conveyor belt 3 is controlled by the driving system, thereby controlling a thickness of an ice coating.

The first conveyor belt is slightly inclined, and a lower portion of the first conveyor belt is immersed in the ice-coating liquid. A driven wheel 18 of the first conveyor belt is provided with a slide rail 19 to adjust a height of the first conveyor belt.

The water inlet pipe 6 and the drain valve 9 each are provided with a solenoid valve which is controlled by the control system 14.

The first conveyor belt 2 and the second conveyor belt 3 are made of food-grade stainless steel mesh belts, and separators 16 are provided on surfaces of the first conveyor belt and the second conveyor belt to move the shrimps.

Specifically, this embodiment provides automatic immersion ice-coating machine for shrimps, including a frame, an ice-coating working pool, a first conveyor belt, a second conveyor belt, a feed port. Eight support columns are installed at a lower end of the frame, and the support column and the frame are connected by a truss; a universal wheel is installed at a lower end of the support column. The conveyor belts can adopt food-grade stainless steel mesh belts, and a plurality of separators are arranged on the mesh belts in a spaced manner. A control system and a drive device are provided under the right side of the frame, which can automatically control the liquid level. An inverter is installed in the drive device to control the speed of the conveyor belts.

A buffer tank is fixed on a side of the ice-coating working pool, and the buffer tank and ice-coating working pool are connected via the water inlet pipe. The bottom of the ice-coating working pool is set to incline from the right side to the left side; or as shown in the drawings, the ice-coating working pool comprises a higher section, an inclined section and a lower section which are sequentially connected from the second side to the first side. A drain valve is set at a bottom of the ice-coating working pool, and the water inlet pipe and the drain valve each are provided with a solenoid valve which is controlled by the control system.

A nozzle is arranged on the right side of the ice-coating working pool. The nozzle sucks the liquid in the ice-coating working pool through a jet pump, and then is driven to spray the ice-coating liquid by the jet pump. When the shrimps enter the second conveyor belt from the first conveyor belt, the shrimps are disturbed by the liquid sprayed by the nozzle and fall onto the second conveyor belt under the action of the flow in that direction.

The first conveyor belt is located above the second conveyor belt. The upper portion of the first conveyor belt inclines from the right side to the left side. The second conveyor belt inclines from the right side to the left side, which corresponds to the bottom of the ice-coating working pool. A feed port is arranged above the first conveyor belt, and an inclined baffle is arranged at the feed port. The discharge port is arranged at a higher side of the bottom of the ice-coating working pool, and the control system and the drive device are arranged under the discharge port.

A driven wheel of the first conveyor belt can be supported at an arc-shaped slide rail through which the height of the first conveyor belt is adjusted. The lower portion of the first conveyor belt is lower than the surface of the ice-coating liquid, so that during the operation, the shrimps are avoided to float on the liquid surface, thereby ensuring the ice-coating effect.

The inverter is installed inside the drive device to adjust the rotation speed of the driving wheels of the conveyor belt. The thickness of the ice coating is controlled by the residence time of the shrimps in the ice-coating fluid, which is controlled by the transmission speed of the first and second conveyor belts.

The conveyor belts adopt the mesh belt as a material carrying surface, and separators are spaced on the conveyor belts to ensure the inclined transportation of the material.

The shrimps to be coated are put into the feed port, and then enter the first conveyor belt. The first conveyor belt rotates anticlockwise to bring the shrimps to the ice-coating liquid from the first side of the first conveyor belt. At the same time, the nozzle is controlled by the control system to spray the ice-coating liquid, causing the shrimps roll in the ice-coating liquid. After coated with an even ice coating, the shrimps fall onto the second conveyor belt, and then the ice coating is continuously coated onto the shrimps on the second conveyor belt. Finally, the shrimps are taken out of the ice-coating liquid via the second conveyor belt.

During the ice coating process, the temperature sensor monitors the temperature in the ice-coating working pool. When the temperature in the ice-coating working pool deviates from the set temperature, the control system will automatically start the refrigeration device to automatically control the temperature in the ice-coating working pool. When the level sensor detects that the liquid level drops, the control system will automatically open the solenoid valve on the water inlet pipe to replenish the ice-coating liquid from the buffer tank to the ice-coating working pool.

The automatic immersion ice-coating machine of the invention has a simple structure and high degree of automation. In addition, with such ice-coating machine, the ice-coating process is highly efficient, and the ice coating has an even thickness and no burr. This can significantly improve the production efficiency.

The above-mentioned embodiment is only intended to illustrate the principle and uses of the present invention, and its description is more specific and detailed, but it cannot be understood as limiting the scope of the patent of the present disclosure. It should be pointed out those of ordinary skill in the art may further make a plurality of variations and improvements without departing from the concept of the present invention, and these all pertain to the protection scope of the present invention. Therefore, all equivalent modifications or changes made by those ordinary skill without departing from the spirit and technical ideas of the present invention shall fall within the scope of the appended claims of the present invention.

What is claimed is:

1. An automatic immersion ice-coating machine, comprising:
   a frame,
   an ice-coating working pool,
   a feed port,
   a discharge port,
   a conveying device,
   a control system, and
   a driving system;
   wherein the frame is provided with a first conveyor belt and a second conveyor belt; and a driven wheel of the first conveyor belt is provided with a slide rail to adjust a height difference between the first conveyor belt and the second conveyor belt;
   the slide rail is arc-shaped;
   the ice-coating working pool and a buffer tank are arranged in the frame; the buffer tank is fixed outside the ice-coating working pool, and a water inlet pipe is fixedly connected with the buffer tank and the ice-coating working pool;
   a level sensor and a nozzle are fixed on a first inner wall of the ice-coating working pool; a temperature sensor is fixed on a second inner wall opposite to the first inner wall of the ice-coating working pool; and a drain valve is mounted at a bottom of the ice-coating working pool; and
   the feed port is arranged above the first conveyor belt of the frame, and a ramp baffle is arranged at the feed port for feeding in an inclined manner.

2. The automatic immersion ice-coating machine of claim 1, wherein eight support columns are fixed at a lower end of the frame, a wheel is installed at a lower end of each of the support columns, and a truss is installed at a joint between each of the support columns and the frame for connection.

3. The automatic immersion ice-coating machine of claim 1, wherein a bottom of the ice-coating working pool is stepped or inclined, and the drain valve is arranged at a bottom of the ice-coating working pool.

4. The automatic immersion ice-coating machine of claim 1, wherein a control system and a drive device are arranged under the discharge port; when the level sensor detects that a level of an ice-coating liquid drops, the control system automatically replenishes the ice-coating liquid from the buffer tank and sounds an alarm when the ice-coating liquid in the buffer tank is insufficient; and
   an inverter is installed in the drive device, and a speed of the first conveyor belt and the second conveyor belt is controlled by a drive system, thereby controlling a thickness of an ice coating.

5. The automatic immersion ice-coating machine of claim 1, wherein an upper portion of the first conveyor belt is inclined, and a lower portion of the first conveyor belt is immersed in a ice-coating liquid.

6. The automatic immersion ice-coating machine of claim 1, wherein the water inlet pipe and the drain valve each are installed with a solenoid valve which is controlled by the control system.

7. The automatic immersion ice-coating machine of claim 1, wherein the first conveyor belt and the second conveyor belt are made of food-grade stainless steel mesh belts, and separators are arranged on surfaces of the first conveyor belt and the second conveyor belt to move materials.

* * * * *